United States Patent
Amin et al.

(10) Patent No.: US 10,972,588 B2
(45) Date of Patent: Apr. 6, 2021

(54) MICRO-LEVEL NETWORK NODE FAILOVER SYSTEM

(71) Applicant: T-Mobile USA, Inc., Bellevue, WA (US)

(72) Inventors: Rahul Amin, Issaquah, WA (US); Rex Maristela, Renton, WA (US); Fadi El Banna, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 163 days.

(21) Appl. No.: 16/020,459

(22) Filed: Jun. 27, 2018

(65) Prior Publication Data

US 2020/0007666 A1    Jan. 2, 2020

(51) Int. Cl.
| | | |
|---|---|---|
| *G06F 11/00* | (2006.01) | |
| *H04L 29/14* | (2006.01) | |
| *G06F 11/20* | (2006.01) | |
| *H04L 12/24* | (2006.01) | |

(52) U.S. Cl.
CPC .......... *H04L 69/40* (2013.01); *G06F 11/2005* (2013.01); *H04L 41/0668* (2013.01); *G06F 11/2028* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,432,871 B1 * | 4/2013 | Sarnaik | ............. | H04W 76/12 370/331 |
| 9,755,913 B2 * | 9/2017 | Bhide | ................. | G06F 16/248 |
| 10,333,799 B2 * | 6/2019 | Bingham | ................ | G06F 16/21 |
| 10,445,197 B1 * | 10/2019 | Harpreet | ............. | H04L 41/0654 |
| 10,503,348 B2 * | 12/2019 | Maheshwari | ......... | G06F 3/0481 |

(Continued)

FOREIGN PATENT DOCUMENTS

WO    WO 2015/038044    3/2015

OTHER PUBLICATIONS

International Search Report and Written Opinion for International Application No. PCT/US2019/037106, Notification dated Sep. 17, 2019.

*Primary Examiner* — Loan L. T. Truong

(74) *Attorney, Agent, or Firm* — Knobbe Martens Olson & Bear LLP

(57) ABSTRACT

An improved core network that can monitor micro-level issues, identify specific services of specific nodes that may be causing an outage, and perform targeted node failovers in a manner that does not cause unnecessary disruptions in service is described herein. For example, the improved core network can include a failover and isolation server (FIS) system. The FIS system can obtain service-specific KPIs from the various nodes in the core network. The FIS can then compare the obtained KPI values of the respective service with corresponding threshold values. If any KPI value exceeds a corresponding threshold value, the FIS may preliminarily determine that the service of the node associated with the KPI value is responsible for a service outage. The FIS can initiate a failover operation, which causes the node to re-route any received requests corresponding to the service potentially responsible for the service outage to a redundant node.

25 Claims, 7 Drawing Sheets

(56) References Cited

U.S. PATENT DOCUMENTS

| | | | |
|---|---|---|---|
| 10,530,666 B2 * | 1/2020 | Venkitapathi | H04L 43/08 |
| 10,609,570 B2 * | 3/2020 | Martone | H04W 24/06 |
| 2009/0304173 A1 * | 12/2009 | Ravishankar | H04M 3/42 |
| | | | 379/229 |
| 2010/0061249 A1 * | 3/2010 | Rius i Riu | H04L 41/5032 |
| | | | 370/242 |
| 2012/0029977 A1 * | 2/2012 | Alcorn | G06Q 10/06393 |
| | | | 705/7.39 |
| 2014/0046998 A1 * | 2/2014 | Dain | H04L 67/10 |
| | | | 709/201 |
| 2014/0114644 A1 * | 4/2014 | Smith | H04L 41/145 |
| | | | 704/9 |
| 2015/0229778 A1 * | 8/2015 | Sharma | H04M 15/61 |
| | | | 455/406 |
| 2015/0281004 A1 | 10/2015 | Kakadia et al. | |
| 2016/0087856 A1 * | 3/2016 | Groenendijk | H04L 41/0631 |
| | | | 370/242 |
| 2016/0093226 A1 * | 3/2016 | Machluf | G06Q 10/10 |
| | | | 434/236 |
| 2016/0103883 A1 * | 4/2016 | Ramani | G06Q 10/00 |
| | | | 707/725 |
| 2016/0104076 A1 * | 4/2016 | Maheshwari | G06N 20/00 |
| | | | 706/12 |
| 2016/0267420 A1 * | 9/2016 | Budic | G06Q 10/06393 |
| 2016/0321148 A1 * | 11/2016 | Lassini | G06F 11/184 |
| 2017/0019291 A1 * | 1/2017 | Tapia | G06N 20/00 |
| 2017/0295078 A1 * | 10/2017 | Medas | H04L 41/0631 |
| 2017/0310546 A1 * | 10/2017 | Nair | H04L 41/22 |
| 2017/0317873 A1 * | 11/2017 | Hevizi | H04L 41/0672 |
| 2017/0353991 A1 * | 12/2017 | Tapia | G06Q 10/20 |
| 2018/0046510 A1 * | 2/2018 | Boss | G06F 9/5083 |
| 2018/0052912 A1 * | 2/2018 | Fletcher | H04L 41/5032 |
| 2018/0144627 A1 * | 5/2018 | Li | G08G 1/0145 |
| 2018/0152958 A1 * | 5/2018 | Arnold | H04L 41/5009 |
| 2018/0212819 A1 * | 7/2018 | Zhang | H04L 41/0686 |
| 2018/0351855 A1 * | 12/2018 | Sood | H04L 45/28 |
| 2019/0045378 A1 * | 2/2019 | Rosales | G08G 1/0116 |
| 2019/0149550 A1 * | 5/2019 | Brakeville | H04W 12/00 |
| | | | 726/5 |
| 2019/0149977 A1 * | 5/2019 | Seenappa | H04W 28/08 |
| | | | 370/331 |
| 2019/0158578 A1 * | 5/2019 | Ramasamy | H04L 67/101 |
| 2019/0173898 A1 * | 6/2019 | Bharrat | H04L 63/1425 |
| 2019/0261197 A1 * | 8/2019 | Bellamkonda | H04W 24/04 |
| 2020/0007666 A1 * | 1/2020 | Amin | H04L 69/40 |

* cited by examiner

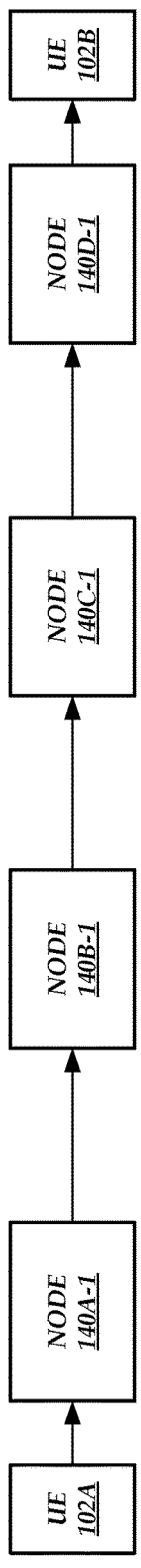
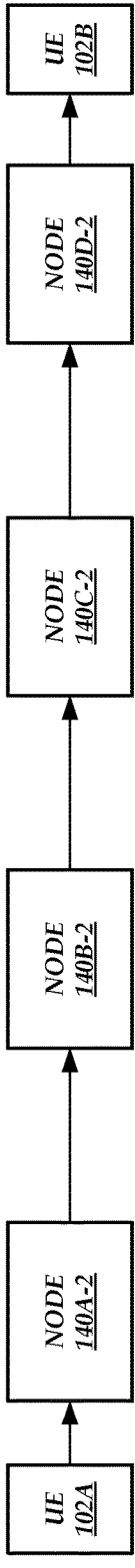
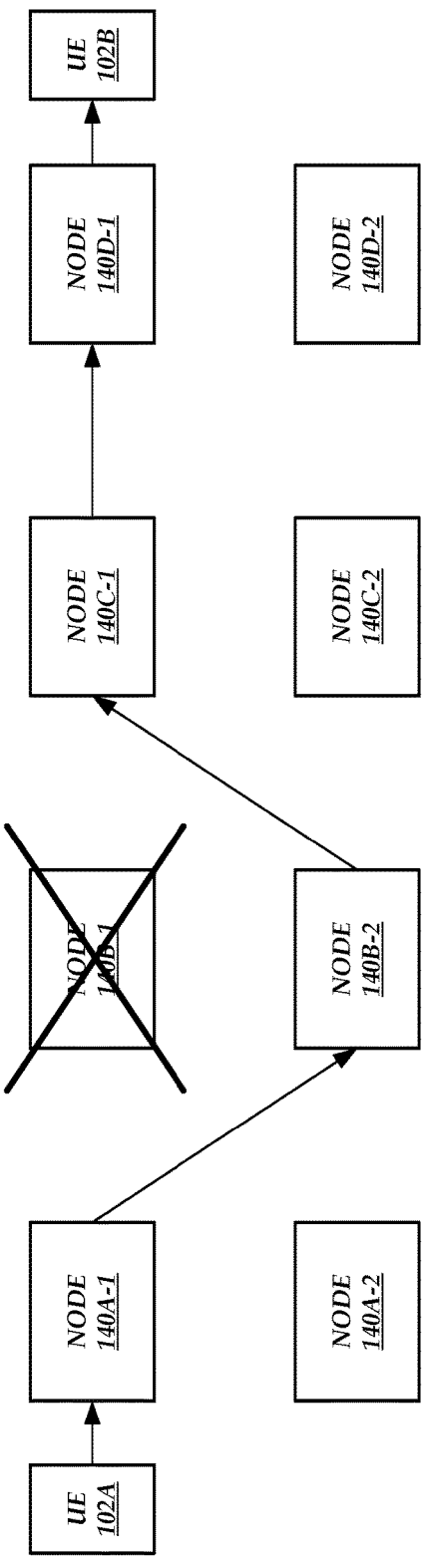

NODE 140A-1 {500}

| SERVICE | KPI VALUES/FAILOVER TRIGGER VALUES | | | | |
|---|---|---|---|---|---|
| SERVICE 502 | $KPI_{1\text{-}A\text{-}502}/$ $TG_{1\text{-}A\text{-}502}$ | $KPI_{2\text{-}A\text{-}502}/$ $TG_{2\text{-}A\text{-}502}$ | $KPI_{3\text{-}A\text{-}502}/$ $TG_{3\text{-}A\text{-}502}$ | $KPI_{4\text{-}A\text{-}502}/$ $TG_{4\text{-}A\text{-}502}$ | $KPI_{5\text{-}A\text{-}502}/$ $TG_{5\text{-}A\text{-}502}$ |
| SERVICE 504 | $KPI_{1\text{-}A\text{-}504}/$ $TG_{1\text{-}A\text{-}504}$ | $KPI_{2\text{-}A\text{-}504}/$ $TG_{2\text{-}A\text{-}504}$ | $KPI_{3\text{-}A\text{-}504}/$ $TG_{3\text{-}A\text{-}504}$ | $KPI_{4\text{-}A\text{-}504}/$ $TG_{4\text{-}A\text{-}504}$ | $KPI_{5\text{-}A\text{-}504}/$ $TG_{5\text{-}A\text{-}504}$ |
| SERVICE 506 | $KPI_{1\text{-}A\text{-}506}/$ $TG_{1\text{-}A\text{-}506}$ | $KPI_{2\text{-}A\text{-}506}/$ $TG_{2\text{-}A\text{-}506}$ | $KPI_{3\text{-}A\text{-}506}/$ $TG_{3\text{-}A\text{-}506}$ | $KPI_{4\text{-}A\text{-}506}/$ $TG_{4\text{-}A\text{-}506}$ | $KPI_{5\text{-}A\text{-}506}/$ $TG_{5\text{-}A\text{-}506}$ |

NODE 140B-1 {550}

| SERVICE | KPI VALUES/FAILOVER TRIGGER VALUES | | | | |
|---|---|---|---|---|---|
| SERVICE 502 | $KPI_{1\text{-}B\text{-}502}/$ $TG_{1\text{-}B\text{-}502}$ | $KPI_{2\text{-}B\text{-}502}/$ $TG_{2\text{-}B\text{-}502}$ | $KPI_{3\text{-}B\text{-}502}/$ $TG_{3\text{-}B\text{-}502}$ | $KPI_{4\text{-}B\text{-}502}/$ $TG_{4\text{-}B\text{-}502}$ | $KPI_{5\text{-}B\text{-}502}/$ $TG_{5\text{-}B\text{-}502}$ |
| SERVICE 504 | $KPI_{1\text{-}B\text{-}504}/$ $TG_{1\text{-}B\text{-}504}$ | $KPI_{2\text{-}B\text{-}504}/$ $TG_{2\text{-}B\text{-}504}$ | $KPI_{3\text{-}B\text{-}504}/$ $TG_{3\text{-}B\text{-}504}$ | $KPI_{4\text{-}B\text{-}504}/$ $TG_{4\text{-}B\text{-}504}$ | $KPI_{5\text{-}B\text{-}504}/$ $TG_{5\text{-}B\text{-}504}$ |
| SERVICE 506 | $KPI_{1\text{-}B\text{-}506}/$ $TG_{1\text{-}B\text{-}506}$ | $KPI_{2\text{-}B\text{-}506}/$ $TG_{2\text{-}B\text{-}506}$ | $KPI_{3\text{-}B\text{-}506}/$ $TG_{3\text{-}B\text{-}506}$ | $KPI_{4\text{-}B\text{-}506}/$ $TG_{4\text{-}B\text{-}506}$ | $KPI_{5\text{-}B\text{-}506}/$ $TG_{5\text{-}B\text{-}506}$ |

*Fig. 5*

MICRO-LEVEL NETWORK NODE FAILOVER SYSTEM

BACKGROUND

A core network (also known as network core or backbone network) is the central part of a telecommunications network that provides various services to telecommunication devices, often referred to as user equipment ("UE"), that are connected by access network(s) of the telecommunications network. Typically, a core network includes high capacity communication facilities that connect primary nodes, and provides paths for the exchange of information between different sub-networks.

Operations of the primary nodes and other nodes in the core network are often adjusted via software upgrades, hardware upgrades, firmware upgrades, and/or the like. In some cases, these upgrades can cause a service outage. A service outage can be problematic because the service outage may result in service disruptions. The service outage may also result in delays in the introduction of new features or functionality in the core network because the upgrade(s) that resulted in the service outage may be rolled back until a repair is identified.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 4A-4B are block diagrams depicting example service request paths for a service that form a portion of a service request graph generated by the failover and isolation server (FIS) of FIG. 1, according to one embodiment.

FIG. 5 illustrates example tables depicting KPI values and corresponding threshold values for various services offered by nodes, according to one embodiment.

DETAILED DESCRIPTION

Figure 1:
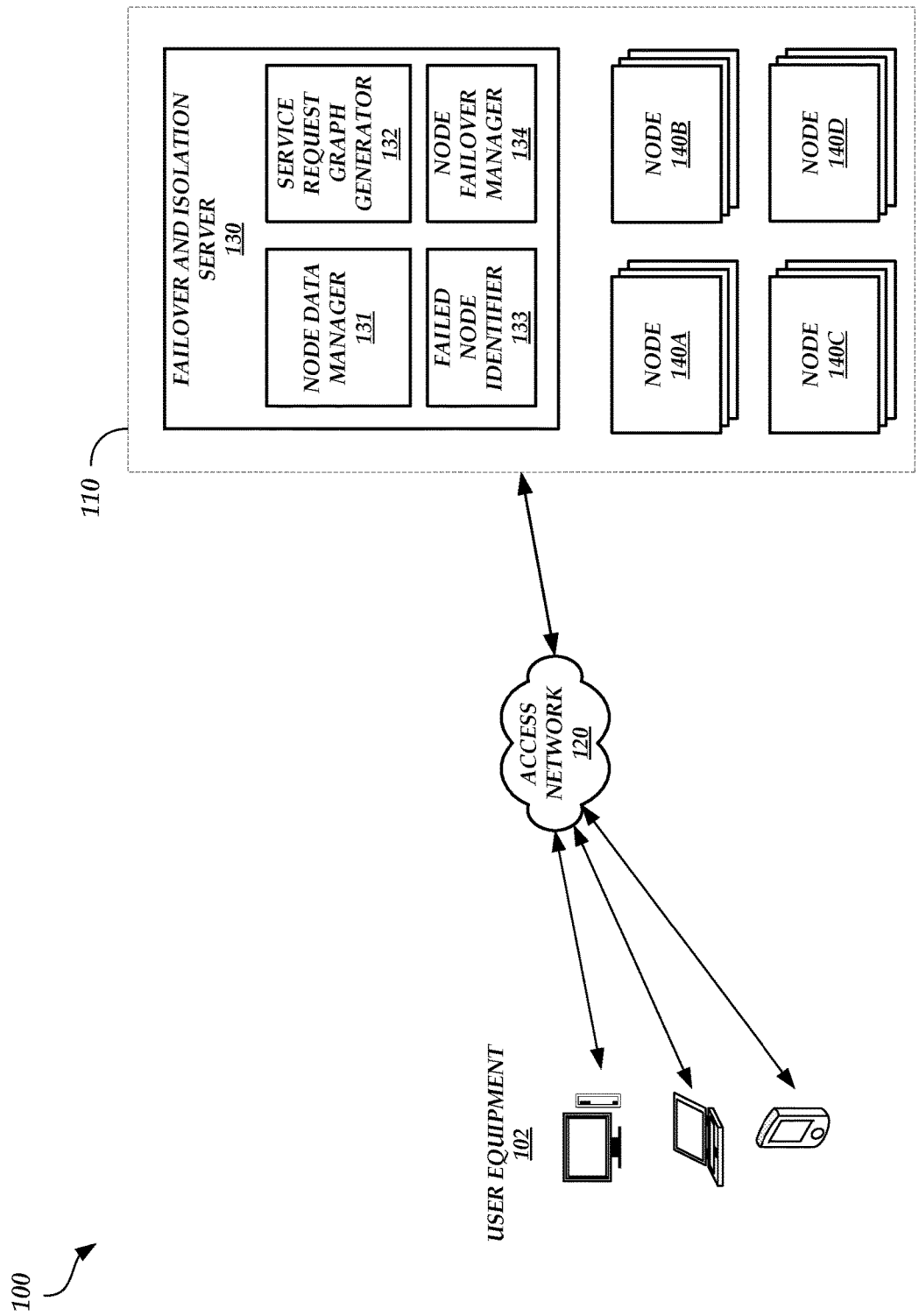
FIG. 1 is a block diagram of an illustrative micro-level node failover environment in which a failover and isolation server (FIS) monitors various nodes in a core network and initiates targeted failovers when a service outage is detected.

As described above, a core network can include primary nodes and other nodes (e.g., a session border controller (SBC), a call session control function (CSCF), a breakout gateway control function (BGCF), a media gateway controller function (MGCF), etc.) used to process requests. For example, when a first UE attempts to call a second UE, a call request may originate at the first UE, pass through and be processed by one or more nodes in the core network, and terminate at the second UE. The core network can experience service outages due to node upgrades, such as software upgrades, hardware upgrades, firmware upgrades, and/or the like. In typical core networks, an outage can be identified and a node failover can be triggered when a macro-level event occurs, such as a hardware failure, a line card failure, high utilization of a central processing unit (CPU), high utilization of memory, high utilization of input/output (I/O) operations, a software failure, a kernel failure, application disruption, network disruption, and/or the like.

Generally, a single node can process requests for different services (e.g., a file transfer service, voice call service, call waiting service, conference call service, video chat service, short message service (SMS), etc.). However, an upgrade applied to a node may correspond to a specific service. Thus, in some circumstances, an upgrade may cause a micro-level issue, such as the failure of a specific service offered by a node. The other services offered by the node, though, may still be operational. Despite the micro-level issue occurring, because typical core networks monitor macro-level events and not micro-level events (e.g., the failure of a single service on a single node), no failover may be triggered (at least until the micro-level issue becomes a macro-level issue). One reason typical core networks operate in this manner is because macro-level node key performance indicators (KPIs) are monitored (e.g., the health status of the node's hardware components, the health status of the node's software (e.g., operating system, kernel, etc.), a node CPU usage, a node memory usage, a number of node I/O operations in a given time period, etc.) rather than micro-level node KPIs (e.g., application or service-specific KPIs, such as the data transfer rate of a file transfer service, the percentage of dropped voice calls, the percentage of dropped video calls, the uplink and/or downlink speeds for a video chat service, SMS transmission times, etc.). Thus, typical core networks have no mechanism for identifying micro-level issues and taking appropriate action to resolve such issues.

In addition, if a typical core network identifies a service outage, the node failover generally involves a service provider taking the entire node out of service even though some services offered by the node may still be operational. Thus, some services may unnecessarily be disrupted. Once the node is taken out of service, a technician may perform a root cause analysis to identify what caused the service outage. However, the upgraded node may not have necessarily caused the service outage. For example, a service outage could occur as a result of the upgraded node, but it could also or alternatively occur as a result of a node downstream from the upgraded node and/or a node upstream from the upgraded node. Thus, prematurely removing the upgraded node from service without performing any prior analysis may not lead to a resolution of the service outage and may result in further service disruptions.

Accordingly, described herein is an improved core network that can monitor micro-level issues, identify specific services of specific nodes that may be causing an outage, and perform targeted node failovers in a manner that does not cause unnecessary disruptions in service. For example, core networks generally provide redundant services to account for unexpected events. In particular, a core network may include several nodes located in the same or different geographic regions that each offer the same services and perform the same operations. Thus, if one node fails, requests can be re-routed to a redundant node that offers the same services. The improved core network described herein can leverage the redundant nature of core networks to implement service-specific re-routing of requests in the event of a service outage.

As an example, the improved core network can include a failover and isolation server (FIS) system. The FIS system can obtain service-specific KPIs from the various nodes in the core network. Because a node may offer a plurality of services, the FIS system can collect one or more service-specific KPIs for each service offered by a particular node. Based on the KPI data and/or other information provided by the nodes, the FIS can create a service request graph. The service request graph may identify one or more paths that a service request follows when originating at a first UE and terminating at a second UE. The service request graph can identify a plurality of paths for each of a plurality of services.

For each service, the FIS can then compare the obtained KPI values of the respective service with corresponding threshold values. If any KPI value exceeds (or does not exceed) a corresponding threshold value, the FIS may preliminarily determine that the service of the node associated with the KPI value is responsible for a service outage. The FIS can initiate a failover operation, which causes the node to re-route any received requests corresponding to the service potentially responsible for the service outage to a redundant node. The FIS can then continue to compare the remaining KPI values with the corresponding threshold values. If another KPI value corresponding to a second node exceeds (or does not exceed) a corresponding threshold value, the FIS can determine whether the original node or the second node is associated with a worse KPI value (e.g., a KPI value that is further from an acceptable KPI value as represented by the corresponding threshold value), reverse the failover of the original node if the second node is associated with a worse KPI value, and initiate a failover operation directed at the second node if the second node is associated with a worse KPI value. The FIS can repeat the above operations until all KPI values for a particular service have been evaluated. The FIS can also repeat the above operations for some or all of the services offered in the core network.

By implementing these techniques, the FIS is able to monitor the performance of various services on various nodes and, based on the monitoring, identify specific services on specific nodes that may be causing a service outage. Instead of removing an entire node from service once the node is identified as potentially causing a service outage, the FIS can instead instruct the node to re-route select requests to a redundant node—specifically, requests that correspond to the service offered by the node that may have caused a service outage. Thus, the FIS allows a node to remain operational even if one service offered by the node is causing a service outage. In addition, the FIS can leverage the redundant nature of the core network to minimize service disruptions by allowing service requests to be re-routed to another node that can perform the same tasks and that is operational.

The foregoing aspects and many of the attendant advantages of this disclosure will become more readily appreciated as the same become better understood by reference to the following detailed description, when taken in conjunction with the accompanying drawings.

Example Micro-Level Node Failover Environment

FIG. 1 is a block diagram of an illustrative micro-level node failover environment 100 in which a failover and isolation server (FIS) 130 monitors various nodes 140A-D in a core network 110 and initiates targeted failovers when a service outage is detected. The environment 100 includes one or more UEs 102 that communicate with the core network 110 via an access network 120. The core network 110 includes the FIS 130 and various nodes 140A-D.

The UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the UE 102 includes a wide variety of software and hardware components for establishing communications over one or more communication networks, including the access network 120, the core network 110, and/or other private or public networks. For example, the UE 102 may include a subscriber identification module (SIM) card (e.g., an integrated circuit that stores data to identify and authenticate a UE that communicates over a telecommunications network) and/or other component(s) that enable the UE 102 to communicate over the access network 120, the core network 110, and/or other private or public networks via a radio area network (RAN) and/or a wireless local area network (WLAN). The SIM card may be assigned to a particular user account.

The UEs 102 are communicatively connected to the core network 110 via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102 to communicate via the fixed-location transceivers. Although the access network 120 is illustrated as a single network, one skilled in the relevant art will appreciate that the access network can include any number of public or private communication networks and/or network connections.

The core network 110 provides various services to UEs 102 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include a call routing system (embodied as one or more nodes 140A-D), which routes telephone calls, messages, and/or other data across a PSTN or IMS. The core network 110 may provide high capacity communication facilities that connect various nodes implemented on one or more computing devices, allowing the nodes to exchange information via various paths.

The core network 110 may include one or more nodes 140A, one or more nodes 140B, one or more nodes 140C, one or more nodes 140D, and so on. Each node 140A may offer the same services and/or perform the same type of data processing and/or other operations. Each node 140A may also be located in the same geographic region and/or in different geographic regions. Thus, each node 140A may be redundant of other nodes 140A. Similarly, each node 140B may be redundant of other nodes 140B, each node 140C may be redundant of other nodes 140C, and each node 140D may be redundant of other nodes 140D. Furthermore, nodes 140A may perform different services and/or operations than nodes 140B, 140C, and 140D; nodes 140B may perform different services and/or operations than nodes 140A, 140C, and 140D; nodes 140C may perform different services and/or operations than nodes 140A, 140B, and 140D; and nodes 140D may perform different services and/or operations than nodes 140A, 140B, and 140C. While four sets of nodes 140A-D are depicted in FIG. 1, this is not meant to be limiting. The core network 110 may include any number (e.g., 1, 2, 3, 4, 5, 6, 7, etc.) of node sets.

Some or all of the nodes 140A-D may communicate with each other to process a request originating from a first UE 102 and terminating at a second UE 102. For example, a file transfer request originating from a first UE 102 may initially be transmitted to node 140A-1. Node 140A-1 may process the request, generate a result, and transmit the result to node 140B-2. Node 140B-2 may process the result, generate a second result, and transmit the second result to node 140C-1. Node 140C-1 may process the second result, generate a third result, and transmit the third result to node 140D-1. Node 140D-1 may process the third result, generate a fourth result, and transmit the fourth result to a second UE 102 to complete the file transfer request (or complete a first portion of the file transfer request). The path of the file transfer request from the first UE 102 to the second UE 102 via nodes 140A-1, 140B-2, 140C-1, and 140D-1 may be referred to herein as a service request path. In general, a service request path may not include two or more redundant nodes (e.g., a single service request path from a first UE 102 to a second UE 102 may not include both node 140A-1 and node 140A-2 in the path) given that these nodes perform redundant services and/or operations.

In the example of an IMS, nodes 140A may be an SBC, nodes 140B may be a CSCF, nodes 140C may be a BGCF, and nodes 140D may be an MGCF. However, this is not meant to be limiting. The nodes 140A-D can be any component in any type of network or system that includes redundant components and routes requests over various components (e.g., a visitor location register (VLR), a serving general packet radio service (GPRS) support node (SGSN), a mobility management entity (MME), an access network, a network that provides an interface between two different service providers, a network-enabled server or computing system that includes various load balancers and/or firewalls, etc.), and the techniques described herein can be applied to any such type of network or system to identify and resolve service or request failures.

As illustrated in FIG. 1, the FIS 130 may include several components, such as a node data manager 131, a service request graph generator 132, a failed node identifier 133, and a node failover manager 134. In an embodiment, the node data manager 131 can communicate with the various nodes 140A-D to obtain information. For example, the node data manager 131 can obtain node data from the various nodes 140A-D, where the node data includes a node identifier of a respective node, types of requests processed by a respective node, specific requests processed by a respective node (where the request includes a unique ID), a location of the respective node, configuration information (e.g., identifying with which nodes the respective node communicates), and/or the like. The node data manager 131 can forward the node data to the service request graph generator 132 for generating a service request graph, as described in greater detail below. The node data manager 131 can obtain the node data by submitting requests to the various nodes 140A-D or by receiving the node data in response to the various nodes 140-D transmitting the data without being prompted to do so.

As another example, the node data manager 131 can periodically request service-specific KPIs from each of the various nodes 140A-D. In response, the nodes 140A-D can transmit, to the node data manager 131, KPI values for one or more KPIs associated with one or more services offered by the respective node 140A-D. As an illustrative example, if a node 140A-1 offers a file transfer service and an SMS service and monitors three different KPIs related to the file transfer service and two different KPIs related to the SMS service, then the node 140A-1 may transmit KPI values for each of the three different KPIs related to the file transfer service and may transmit KPI values for each of the two different KPIs related to the SMS service. Alternatively, some or all of the nodes 140A-D can proactively transmit KPI values to the node data manager 131 without having the node data manager 131 request such values. The node data manager 131 can provide the KPI values to the failed node identifier 133.

The service request graph generator 132 is configured to generate a service request graph. The service request graph may include one or more paths, where each path corresponds to a particular service. The service request graph may include multiple paths for the same service. For example, a first path for a first service may pass through node 140A-1, node 140B-1, and node 140C-1, and a second path for the first service may pass through node 140A-2, node 140B-2, and node 140C-2. Examples paths are depicted in FIGS. 4A-4B and are described in greater detail below.

The service request graph generator 132 can generate the service request graph using the node data obtained by the node data manager 131. For example, the node data may indicate that specific requests were processed by the various nodes 140A-D. Each request may include or be associated with a unique ID. Thus, the service request graph generator 132 can analyze the node data to identify which nodes processed a first request and/or in what order the nodes processed the first request, generating a path for a service associated with the first request and including the path in the service request graph. The service request graph generator 132 can repeat these operations for different requests associated with different services to form the service request graph. As another example, the node data may indicate services offered by each node 140A-D and the nodes 140A-D with which each node communicates. The service request graph generator 132 can analyze the node data to identify a first service offered by a first node 140A-D, a second node 140A-D that the first node 140A-D communicates with and that offers the first service, a third node 140A-D that the second node 140A-D communicates with and that offers the first service, and so on to generate a path. The service request graph generator 132 can then repeat these operations for different services and nodes 140A-D to form the service request graph.

The failed node identifier 133 can use the KPI values obtained by the node data manager 131 to identify a service on a node 140A-D that may have experienced a failure or outage. For example, the FIS 130 or another system (not shown) may store threshold values for various service-specific KPIs. These threshold values may represent the boundary defining normal operation and irregular operation, where irregular operation may indicate that a failure or outage is occurring or is about to occur. Thus, if a KPI value for a first KPI of a first service exceeds (or does not exceed) a threshold value for the first KPI of the first service, then the first service on the node 140A-D from which the KPI value was obtained may be experiencing (or will be experiencing) a failure or outage. As an illustrative example, a first KPI for a voice call service may be dropped call rate. The threshold value for the dropped call rate may be 0.1%. If the dropped call rate value for the voice call service offered by node 140A-1 is above 0.1% (e.g., 0.2%), then the voice call service on the node 140A-1 may be experiencing (or will be experiencing) a failure or outage. Similarly, a first KPI for file transfer service may be a data transfer rate. The threshold value for the data transfer rate may be 500 kb/s. If the data transfer rate value for the file transfer service offered by node 140-1 is below 500 kb/s (e.g., 450 kb/s), then the file transfer service on the node 140A-1 may be experiencing (or will be experiencing) a failure or outage.

Thus, the failed node identifier 133 can iterate through the obtained KPI values for a particular service, comparing each KPI value with a corresponding threshold value. If the failed node identifier 133 identifies a first KPI value that exceeds (or does not exceed) a corresponding threshold value, then the failed node identifier 133 can transmit an instruction to the node failover manager 134 to initiate failover operations for the service associated with the first KPI value and that is running on the node 140A-D from which the first KPI value is obtained. Optionally, the failed node identifier 133 can use the service request graph to identify nodes 140A-D that offer a particular service (e.g., the nodes 140A-D included in the paths associated with the particular service), and therefore to identify which KPI values to evaluate.

The node failover manager 134, in response to the instruction, can transmit an instruction to the node 140A-D from which the first KPI value is obtained that causes the node 140A-D to forward any received requests corresponding to the service associated with the first KPI value to a redundant node 140A-D. The node failover manager 134 can identify a redundant node 140A-D using the service request graph. In some embodiments, the node failover manager 134 selects the redundant node 140A-D with the best KPI value (e.g., lowest KPI value if a lower KPI value is more desirable, highest KPI value if a higher KPI value is more desirable, etc., where the node failover manager 134 compares redundant nodes 140A-D based on KPI values of the KPI corresponding to the first KPI value) as the node to receive re-routed requests. As an illustrative example, the failed node identifier 133 may instruct the node failover manager 134 to initiate failover operations for a first service running on node 140B-1. Nodes 140B-1 and 140B-2 may be redundant nodes. Thus, the node failover manager 134 may instruct node 140B-1 to forward any requests that are received and that are associated with the first service to the node 140B-2. The node 140B-2 may then process any requests associated with the first service in place of the node 140B-1. However, the node 140B-1 may still continue to process requests associated with services other than the first service. Thus, the node 140B-1 is removed from service only with respect to the first service.

After instructing the node failover manager 134 to initiate the failover operations, the node data manager 131 may obtain a new set of KPI values and the failed node identifier 133 may compare the new set of KPI values with the corresponding threshold values. If the failed node identifier 133 identifies no further KPI values that exceed (or do not exceed) the corresponding threshold values, then FIS 130 has successfully identified the service on the node 140A-D that is causing (or is about to cause) a service outage. The FIS 130 or a separate system (not shown) can then analyze the identified service on the node 140A-D to diagnose and resolve the issue (e.g., by rolling back an applied update, by re-configuring the node 140A-D to be compatible with the update, etc.). Alternatively, a technician can be alerted (e.g., via a text message, an electronic mail alert, via a user interface generated by the FIS 130 or another system, etc.) as to the service on the node 140A-D that is causing the service outage and the technician can diagnose and resolve the issue.

However, if the failed node identifier 133 identifies a second KPI value that exceeds (or does not exceed) a corresponding threshold value, then this may indicate that the initial node 140A-D identified as causing a service outage may not have been the root cause of the service outage because at least one KPI value associated with the service being evaluated by the failed node identifier 133 still exceeds (or does not exceed) a corresponding threshold value. In other words, the failed node identifier 133 determines that the failed node identifier 133 has not yet isolated the node 140A-D causing a service outage. In some embodiments, the failed node identifier 133 can instruct the node failover manager 134 to reverse the failover operations previously initiated (e.g., instruct the node failover manager 134 to instruct the node 140A-D that was initially instructed to re-route requests to no longer re-route requests to a redundant node 140A-D). The failed node identifier 133 can then instruct the node failover manager 134 to initiate failover operations for the service associated with the second KPI value and that is running on the node 140A-D from which the second KPI value is obtained. Alternatively, before instructing the node failover manager 134 to initiate the failover operations, the failed node identifier 133 can compare the first KPI value to the second KPI value (if the first and second KPI values correspond to the same KPI), compare the first KPI value to a corresponding KPI value obtained from the node 140A-D from which the second KPI value is obtained (if the first and second KPI values corresponding to different KPIs), and/or compare the second KPI value to a corresponding KPI value obtained from the node 140A-D from which the first KPI value is obtained (if the first and second KPI values corresponding to different KPIs). Based on the comparison, the failed node identifier 133 can identify the node 140A-D that has the worse KPI value (e.g., e.g., a KPI value that is further from an acceptable KPI value as represented by the corresponding threshold value) and instruct the node failover manager 134 to failover the node 140A-D that has the worse KPI value.

In other embodiments, the failed node identifier 133 compares KPI values of the node 140A-D that was failed over and the node 140A-D from which the second KPI value is obtained before instructing the node failover manager 134 to review the initial failover operations. The failed node identifier 133 may perform the comparison first because the comparison may result in the failed node identifier 133 determining that the node 140A-D initially failed over should remain failed over. Thus, the failed node identifier 133 can perform the comparison first to potentially reduce the number of operations performed by the node failover manager 134.

In an embodiment, the failed node identifier 133 operates a failover timer to differentiate between a service outage caused by a first issue and a service outage caused by a second issue. For example, a first node 140A-D that offers a first service may be the cause of a first service outage. At a later time, before or after the issue caused by the first node 140A-D is resolved, a second node 140A-D that also offers the first service may be the cause of a second service outage. In such a situation, it may be desirable to failover both the first and second nodes 140A-D so that the outage issues caused by the two nodes 140A-D can be resolved. Thus, the failed node identifier 133 can start a failover timer when instructing the node failover manager 134 to failover a first node 140A-D that offers a first service. If the failed node identifier 133 then identifies a second node 140A-D that offers the first service to failover (e.g., after iterating through a new set of KPI values), then the failed node identifier 133 can first compare the value of the failover timer to a threshold healing time. If the value of the failover timer equals or exceeds the threshold healing time, then this may indicate that the issue potentially caused by the second node 140A-D may be a second service outage different than the service outage potentially caused by the first node 140A-D (e.g., rather than an indication that the first node 140A-D is not the cause of a service outage and that the second node 140A-D may be the cause of the service outage). Thus, the failed node identifier 133 can instruct the node failover manager 134 to failover the second node 140A-D and not instruct the node failover manager 134 to reverse the failover of the first node 140A-D. However, if the value of the failover timer does not exceed the threshold healing time, then this may indicate that the second node 140A-D and not the first node 140A-D may be the cause of the same service outage. Thus, the failed node identifier 133 can instruct the node failover manager 134 to reverse the failover of the first node 140A-D and/or instruct the node failover manager 134 to failover the second node 140A-D (e.g., if the KPI value of the second node 140A-D is worse than the KPI value of the first node 140A-D).

The number of times the failed node identifier 133 iterates through the obtained KPI values before settling on a node 140A-D to failover can be user-defined and can be any integer (e.g., 1, 2, 3, 4, 5, etc.). For example, if the failed node identifier 133 is configured to iterate through the obtained KPI values 3 times, then the failed node identifier 133 can iterate through the obtained KPI values a first time. If a KPI value exceeds (or does not exceed) a threshold value, then the failed node identifier 133 can instruct the node failover manager 134 to failover the corresponding first node 140A-D, obtain a first new set of KPI values from the node data manager 131, and iterate through the obtained KPI values a second time. If a KPI value in the first new set exceeds (or does not exceed) a threshold value, then the failed node identifier 133 can instruct the node failover manager 134 to reverse the failover of the first node 140A-D and/or instruct the node failover manager 134 to failover a second node 140A-D corresponding to the KPI value in the first new set, obtain a second new set of KPI values from the node data manager 131, and iterate through the obtained KPI values a third time. If a KPI value in the second new set exceeds (or does not exceed) a threshold value, then the failed node identifier 133 can instruct the node failover manager 134 to reverse the failover of the node 140A-D previously failed over and/or instruct the node failover manager 134 to failover a third node 140A-D corresponding to the KPI value in the second new set. The iteration process would then be completed, and one of the first, second, or third nodes 140A-D would be failed over. Furthermore, if during any of the iterations the failed node identifier 133 does not identify a KPI value that exceeds (or does not exceed) a threshold value, then the process would also be completed (even if the 3 iterations are not yet complete).

The failed node identifier 133 and/or node failover manager 134 can independently perform the above-described operations for each service offered in the core network 110 given that the services are different, are offered by different sets of nodes 140A-D, and/or may be associated with different KPIs. Thus, the failed node identifier 133 and/or node failover manager 134 can repeat the above-described operations for each service offered in the core network 110 (e.g., perform the operations for a first service, then perform the operations again for a second service, then perform the operations again for a third service, and so on). This can result, for example, in a first service on a first node 140A-D being failed over, a second service on a second node 140A-D being failed over, a third service on the first node 140A-D being failed over, a fourth service on a third node 140A-D being failed over, and so on.

The FIS 130 may be a single computing device or may include multiple distinct computing devices, such as computer servers, logically or physically grouped together to collectively operate as a server system. The components of the FIS 130 can each be implemented in application-specific hardware (e.g., a server computing device with one or more ASICs) such that no software is necessary, or as a combination of hardware and software. In addition, the modules and components of the FIS 130 can be combined on one server computing device or separated individually or into groups on several server computing devices. In some embodiments, the FIS 130 may include additional or fewer components than illustrated in FIG. 1.

Example Block Diagram for Generating a Service Request Graph

Figure 2:
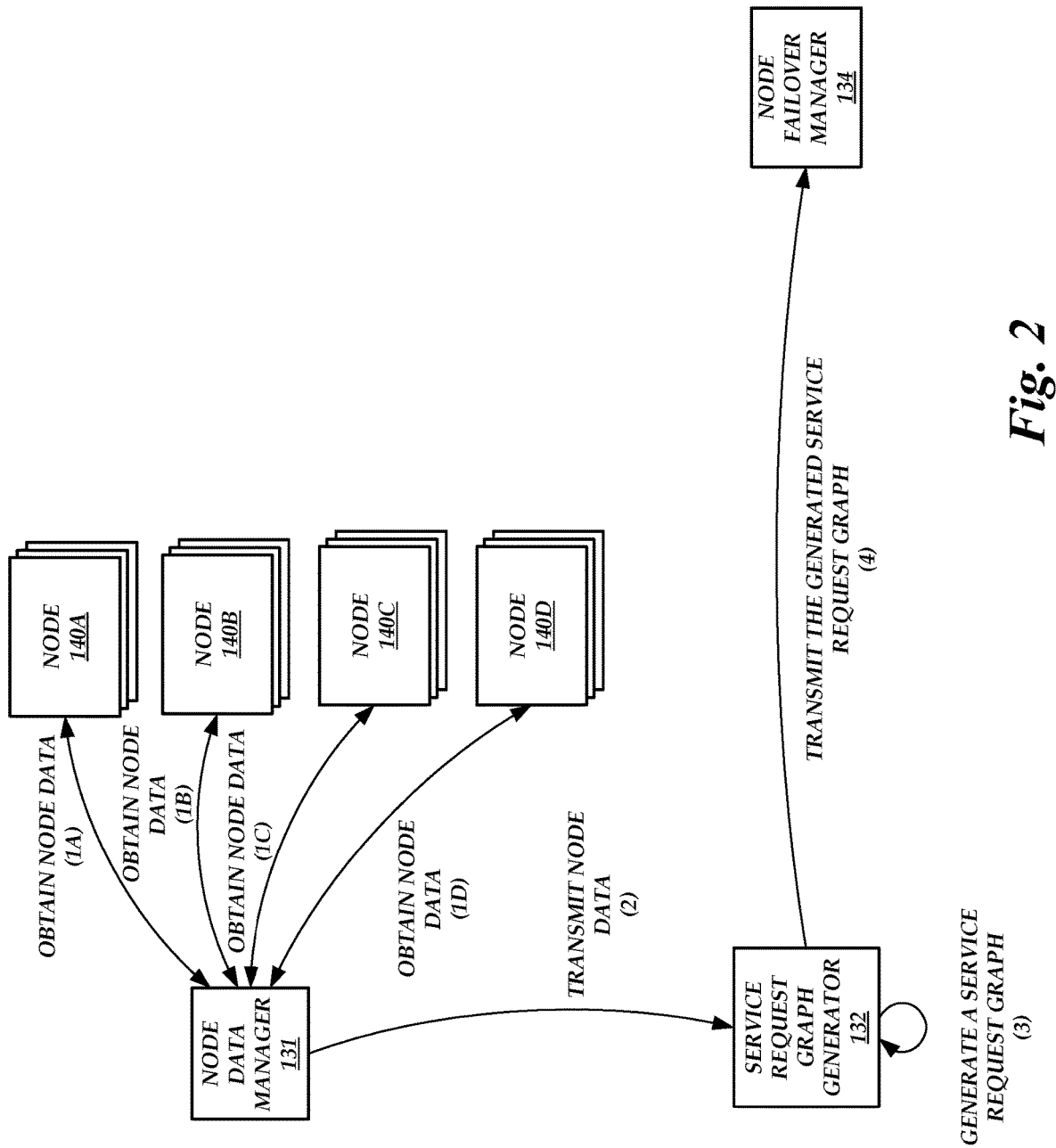
FIG. 2 is a block diagram of the micro-level node failover environment of FIG. 1 illustrating the operations performed by the components of the micro-level node failover environment to generate a service request graph, according to one embodiment.

FIG. 2 is a block diagram of the micro-level node failover environment 100 of FIG. 1 illustrating the operations performed by the components of the micro-level node failover environment 100 to generate a service request graph, according to one embodiment. As illustrated in FIG. 2, the node data manager 131 can obtain node data from nodes 140A at (1A), from nodes 140B at (1B), from nodes 140C at (1C), and from nodes 140D at (1D). The node data manager 131 can obtain the node data by requesting the node data or by receiving a transmission from the nodes 140A-D that is not triggered by a request from the node data manager 131. As described herein, the node data can include a node identifier of a respective node, types of requests processed by a respective node, specific requests processed by a respective node (where the request includes a unique ID), a location of the respective node, configuration information (e.g., identifying with which nodes the respective node communicates), and/or the like. The node data manager 131 can then transmit the node data to the service request graph generator 132 at (2).

The service request graph generator 132 can generate a service request graph at (3). For example, the service request graph generator 132 can generate the service request graph using the node data. As described herein, the service request graph can include one or more paths, where each path corresponds to a particular service.

After the service request graph is generated, the service request graph generator 132 transmits the generated service request graph to the node failover manager 134 at (4). The node failover manager 134 can use the service request graph to identify redundant nodes 140A-D to which certain requests should be re-routed. For example, a redundant node 140A-D may be a node that offers the same service and/or performs the same operations as a subject node 140A-D. The redundant node 140A-D may be a node 140A-D that receives requests from a node 140A-D that is redundant of a node 140A-D from which the subject node 140A-D receives requests. Optionally, the service request graph generator 132 can transmit the service request graph to the failed node identifier 133.

Example Block Diagram for Isolating a Node Causing a Service Outage

Figure 3A:
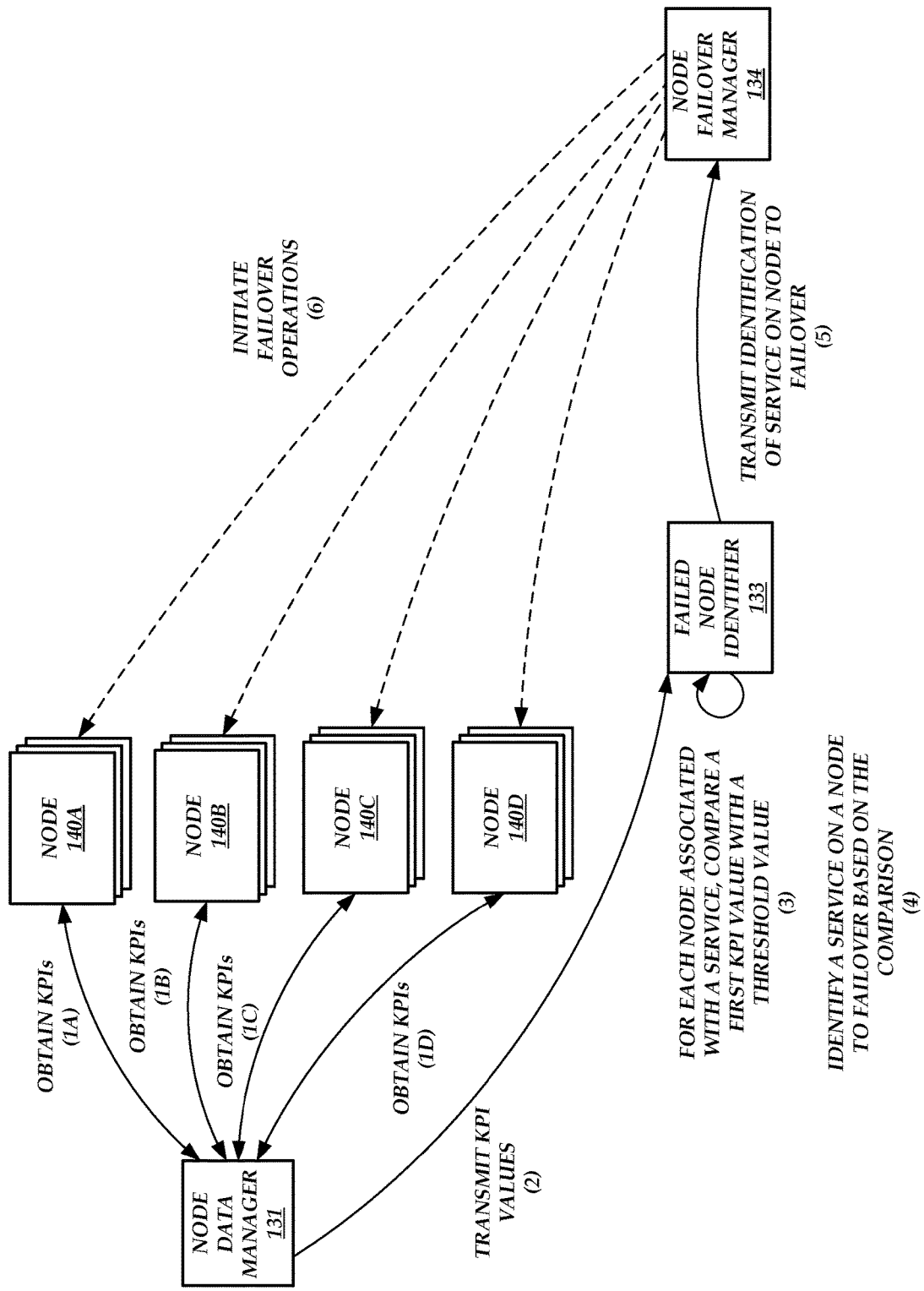
FIGS. 3A-3B are a block diagram of the micro-level node failover environment of FIG. 1 illustrating the operations performed by the components of the micro-level node failover environment to isolate a node causing a service outage, according to one embodiment.
Figure 3B:
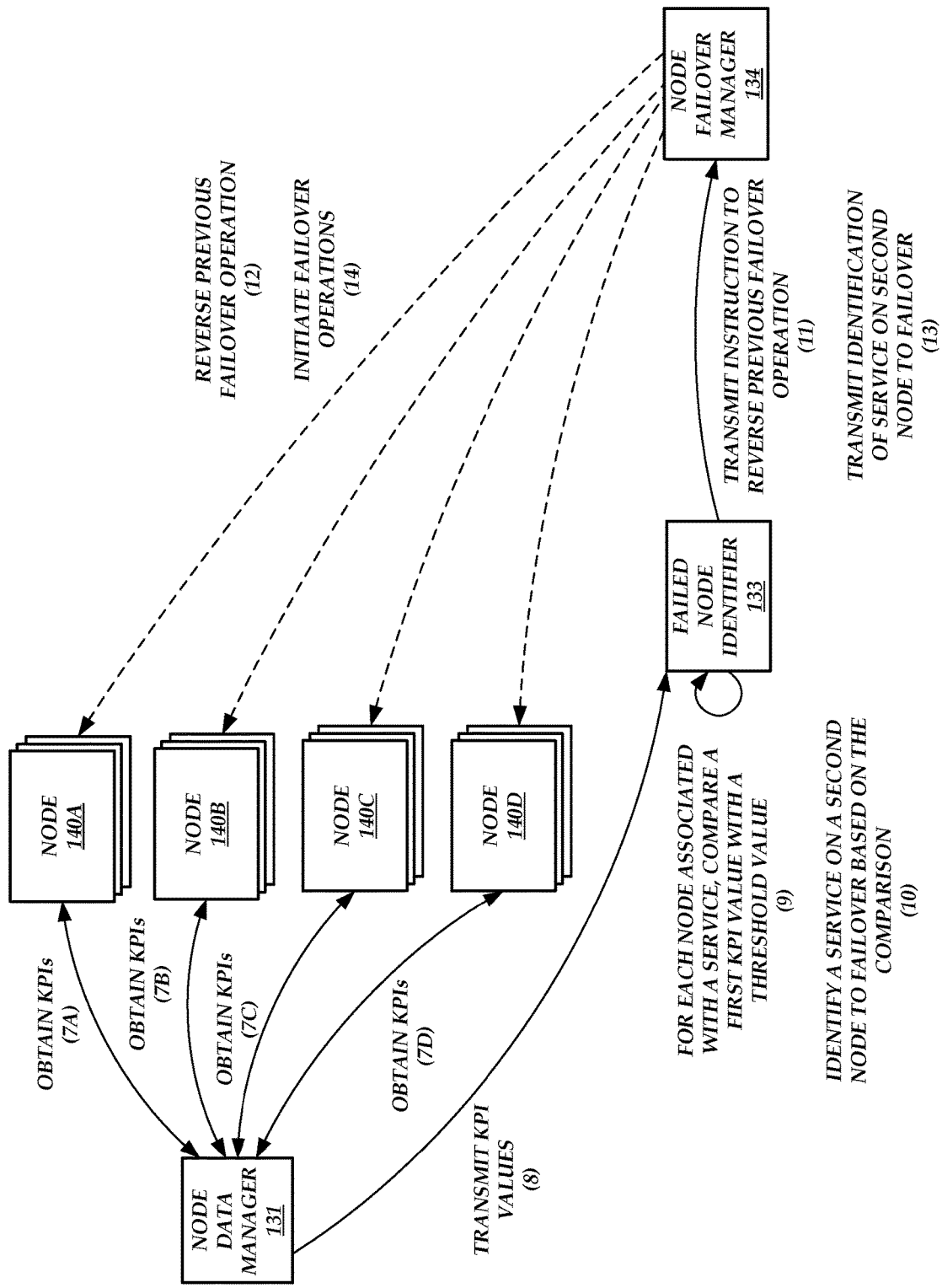

FIGS. 3A-3B are a block diagram of the micro-level node failover environment 100 of FIG. 1 illustrating the operations performed by the components of the micro-level node failover environment 100 to isolate a node causing a service outage, according to one embodiment. As illustrated in FIG. 3A, the node data manager 131 can obtain KPI values from nodes 140A at (1A), from nodes 140B at (1B), from nodes 140C at (1C), and from nodes 140D at (1D). The node data manager 131 can obtain the KPI values by requesting the KPI values or by receiving a transmission from the nodes 140A-D that is not triggered by a request from the node data manager 131. The KPI values may correspond to different services. The node data manager 131 can then transmit the KPI values to the failed node identifier 133 at (2).

The failed node identifier 133 can, for each node 140A-D associated with a service, compare a first KPI value of the respective node and corresponding to the service with a threshold value at (3). Based on the comparison (e.g., based on identifying a first KPI value that exceeds (or does not exceed) the threshold value), the failed node identifier 133 identifies a service on a node to failover at (4). The failed node identifier 133 can then transmit to the node failover manager 134 an identification of a service on a node to failover at (5). The node failover manager 134 can then initiate failover operations at (6) by instructing the identified node to re-route requests received that correspond with the service to a redundant node.

As illustrated in FIG. 3B, the node data manager 131 can obtain new KPI values from nodes 140A at (7A), from nodes 140B at (7B), from nodes 140C at (7C), and from nodes 140D at (7D). The new KPI values may be those generated by the nodes 140A-D after the node failover manager 134 has initiated the failover operations and a service on a node identified as potentially causing a service outage has been taken out of service (e.g., by causing requests to be re-routed to a redundant node). The node data manager 131 can then transmit the new KPI values to the failed node identifier 133 at (8).

The failed node identifier 133 can, for each node 140A-D associated with a service, compare a first new KPI value of the respective node and corresponding to the service with a threshold value at (9). Based on the comparison (e.g., based on identifying a first new KPI value that exceeds (or does not exceed) the threshold value), the failed node identifier 133 identifies a service on a second node to failover at (10). For example, even though a first node was failed over as illustrated in FIG. 3A, the failover may not have resolved the service outage. Thus, the node initially failed over may not actually be the node that caused the service outage. Instead, the second node may be the cause of the service outage. Accordingly, the failed node identifier 133 can transmit an instruction to the node failover manager 134 to reverse the previous failover operation at (11) (e.g., instruct the node failover manager 134 to instruct the node that was failed over to no longer re-route requests corresponding to the service). In response, the node failover manager 134 can reverse the previous failover operation at (12).

Furthermore, the failed node identifier 133 can transmit to the node failover manager 134 an identification of the service on the second node to failover at (13). In response, the node failover manager 134 can then initiate failover operations at (14) by instructing the second node to re-route requests received that correspond with the service to a redundant node.

Example Service Request Graph

FIGS. 4A-4B are block diagrams depicting example service request paths for a service 400 that form a portion of a service request graph generated by the FIS 130, according to one embodiment. As illustrated in FIG. 4A, a first service request path for service 400 includes, in order, UE 102A, node 140A-1, node 140B-1, node 140C-1, node 140D-1, and UE 102B. A second service request path for service 400 includes, in order, UE 102A, node 140A-2, node 140B-2, node 140C-2, node 140D-2, and UE 102B. In an embodiment, nodes 140A-1 and 140A-2 may be redundant nodes, node 140B-1 and 140B-2 may be redundant nodes, nodes 140C-1 and 140C-2 may be redundant nodes, and nodes 140D-1 and 140D-2 may be redundant nodes.

After performing the operations described herein, the failed node identifier 133 may determine that node 140B-1 is causing a service outage in service 400 and may instruct the node failover manager 134 to failover the node 140B-1. In response, the node failover manager 134 may instruct the node 140B-1 to re-route requests received that correspond to the service 400 to redundant node 140B-2. Accordingly, as illustrated in FIG. 4B, a failover path for service 400 includes, in order, UE 102A, node 140A-1, node 140B-2 (instead of node 140B-1), node 140C-1, node 140D-1, and UE 102B. In other embodiments, not shown, the failover path may include node 140C-2 instead of node 140C-1 and/or node 140D-2 instead of 140D-1. The node 140B-2 may determine whether to route the request to node 140C-1 or node 140C-2 based on the respective loads of each node 140C-1, 140C-2 (e.g., the node 140B-2 may route the request to the node 140C-1, 140C-2 that is using fewer computing resources, has more capacity to process requests, or otherwise has a lighter load). Likewise, the node 140C-1 and/or the node 140C-2 may perform the same determination in determining whether to route the request to node 140D-1 or node 140D-2.

Example KPI Values and Threshold Values

FIG. 5 illustrates example tables 500 and 550 depicting KPI values and corresponding threshold values for various services 502, 504, and 506 offered by nodes 140A-1 and 140B-1, according to one embodiment. As illustrated in FIG. 5, the table 500 depicts KPI values and corresponding threshold values (e.g., also referred to herein as "failover trigger values") for the services 502, 504, and 506 offered by node 140A-1. The table 550 depicts KPI values and corresponding failover trigger values for the services 502, 504, and 506 offered by node 140B-1.

For example, one or more KPI values may be associated with each service 502, 504, 506 offered by the node 140A-1, and one or more KPI values may be associated with each service 502, 504, 506 offered by the node 140B-1. As an illustrative example, five KPI values $KPI_{1-A-502}$, $KPI_{2-A-502}$, $KPI_{3-A-502}$, $KPI_{4-A-502}$, and $KPI_{5-A-502}$ correspond with five threshold values $TG_{1-A-502}$, $TG_{2-A-502}$, $TG_{3-A-502}$, $TG_{4-A-502}$, and $TG_{5-A-502}$, respectively. Similarly, five KPI values $KPI_{1-B-502}$, $KPI_{2-B-502}$, $KPI_{3-B-502}$, $KPI_{4-B-502}$, and $KPI_{5-B-502}$ correspond with five threshold values $TG_{1-B-502}$, $TG_{2-B-502}$, $TG_{3-B-502}$, $TG_{4-B-502}$, and $TG_{5-B-502}$, respectively. The failed node identifier 133 may start with the service 502 and the $KPI_1$ and iterate through each combination of $KPI_1$ and $TG_1$ corresponding to the service 502 and the nodes 140A-1, node 140B-1, and so on. If any $KPI_1$ exceeds (or does not exceed) a corresponding $TG_1$, then the failed node identifier 133 can instruct the node failover manager 134 to initiate failover operations directed at the associated node 140A-1, node 140B-1, etc. The failed node identifier 133 can then obtain new $KPI_1$ values and repeat these operations. Once the failed node identifier 133 has finished evaluating the $KPI_1$ and $TG_1$ combinations, then the failed node identifier can start with the service 502 and the $KPI_2$ and iterate through each combination of $KPI_2$ and $TG_2$ corresponding to the service 502 and the nodes 140A-1, node 140B-1, and so on in a manner as described above. Once the failed node identifier 133 has finished evaluating the $KPI_2$ and $TG_2$ combinations, then the failed node identifier can finish evaluating the remaining KPI and TG combinations corresponding to the service 502. Once the failed node identifier 133 has finished evaluating all KPI and TG combinations corresponding to the service 502, then the failed node identifier 133 has finished evaluating all nodes that may have contributed to a service 502 outage.

Before, during, or after evaluating all KPI and TG combinations corresponding to the service 502, the failed node identifier 133 can start with the service 504 and the $KPI_1$ and iterate through each combination of $KPI_1$ and $TG_1$ corresponding to the service 504 and node 140A-1, node 140B-1, and so on and/or start with the service 506 and the $KPI_1$ and iterate through each combination of $KPI_1$ and $TG_1$ corresponding to the service 506 and node 140A-1, node 140B-1, and so on. As described herein, the failed node identifier 133 evaluates the KPI and TG combinations corresponding to one service independently of the evaluation of the KPI and TG combinations corresponding to another service. Thus, any instructions that the failed node identifier 133 generates as a result of comparing KPIs and TGs for service 502 may not affect what instructions the failed node identifier 133 generates as a result of comparing KPIs and TGs for service 504 or service 506.

While FIG. 5 illustrates each node 140A-1 and 140B-1 as offering the same three services 502, 504, and 506, this is not meant to be limiting. Each of nodes 140A-1 and 140B-1 can offer the same or different services and any number of services (e.g., 1, 2, 3, 4, 5, etc.). Similarly, while FIG. 5 illustrates each node 140A-1 and 140B-1 as monitoring the same five KPIs for service 502, the same five KPIs for service 504, and the same five KPIs for service 506, this is not meant to be limiting. Each of nodes 140A-1 and 140B-1 can monitor the same or different KPIs for each service and any number of KPIs (e.g., 1, 2, 3, 4, 5, etc.).

Example Failover Operation Routine

Figure 6:
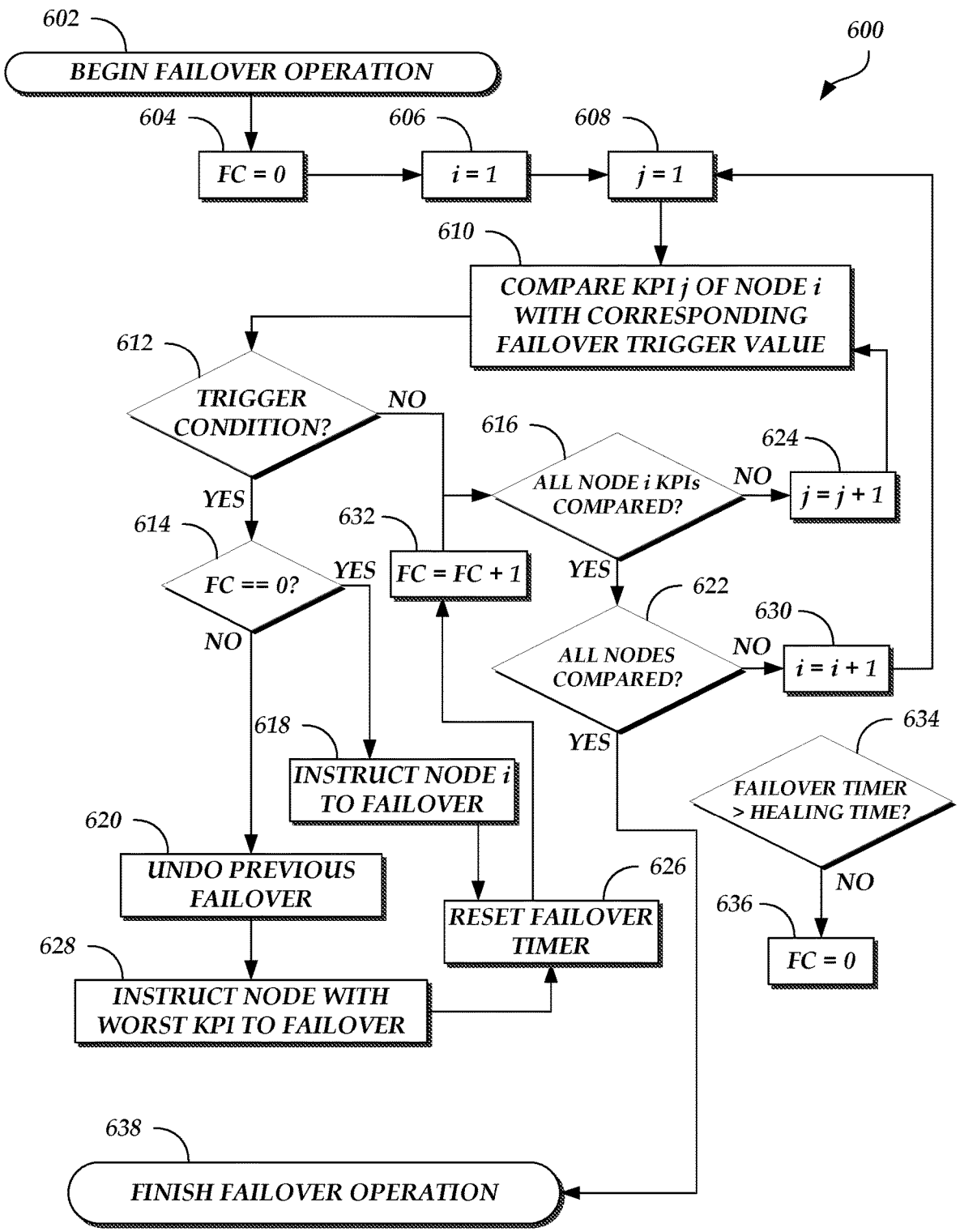
FIG. 6 is a flow diagram depicting a failover operation routine illustratively implemented by a FIS, according to one embodiment.

FIG. 6 is a flow diagram depicting a failover operation routine 600 illustratively implemented by a FIS, according to one embodiment. As an example, the FIS 130 of FIG. 1 can be configured to execute the failover operation routine 600. In an embodiment, the FIS 130 executes the failover operation routine 600 with respect to a particular service. The failover operation 600 begins at block 602.

At block 604, a failover counter (FC) is set to 0. The FC may be used to determine whether a previous failover operation should be reversed, as described in greater detail below.

At block 606, variable i is set to an initial setting, such as 1. The variable i may identify a node that is being evaluated by the FIS 130.

At block 608, variable j is set to an initial setting, such as 1. The variable j may identify a KPI that is being evaluated by the FIS 130.

At block 610, KPI j of node i is compared with a corresponding failover trigger value. For example, the KPI j may correspond to the service for which the FIS 130 executes the failover operation routine 600.

At block 612, a determination is made as to whether a trigger condition is present. A trigger condition may be present if the KPI j exceeds (or does not exceed) the corresponding failover trigger value. If a trigger condition is present, the failover operation routine 600 proceeds to block 614. Otherwise, if a trigger condition is not present, the failover operation routine 600 proceeds to block 616.

At block 614, a determination is made as to whether the FC is 0. If the FC is 0, this may indicate that no other node has been failed over or a sufficient amount of time has passed since the last node was failed over such that the network may have healed in the interim. If the FC is 0, the failover operation routine 600 proceeds to block 618. Otherwise, if the FC is not 0, the failover operation routine 600 proceeds to block 620.

At block 616, a determination is made as to whether all node i KPIs have been compared with corresponding failover trigger values. If all node i KPIs have been compared with corresponding failover trigger values, then the failover operation routine 600 proceeds to block 622. Otherwise, if all node i KPIs have not been compared with corresponding failover trigger values, then the failover operation routine 600 proceeds to block 624 so that the next KPI and failover trigger value combination can be compared.

At block 618, node i is instructed to failover. For example, node i may be the node corresponding to the KPI value that exceeded (or did not exceed) the corresponding failover trigger value. The failover instruction may direct node i to redirect requests corresponding to the service being evaluated by the FIS 130 to a redundant node. After instructing node i to failover, the failover operation routine 600 proceeds to block 626.

At block 620, a previous failover operation is reversed. For example, a node initially identified as causing an outage in the service may not actually be the node that caused the outage. Rather, node i may be the node that is causing the outage. Thus, the node previously failed over can be instructed to no longer re-route requests corresponding to the service (e.g., the node previously failed over is put back into service). After undoing the previous failover operation, the failover operation routine 600 proceeds to block 628.

At block 622, a determination is made as to whether all nodes that offer the service have been compared or evaluated. For example, all nodes have been compared or evaluated if all KPIs monitored by the node that correspond with the service have had their values compared with corresponding failover trigger values. If all nodes that offer the service have been compared or evaluated, the failover operation routine 600 proceeds to block 638 and ends. Otherwise, if all nodes that offer the service have not been compared or evaluated, the failover operation routine 600 proceeds to block 630 so that the next node can be evaluated or compared.

At block 624, the variable j is incremented by an appropriate amount, here 1. The failover operation routine 600 then reverts back to block 610 so that the next KPI can be compared with a corresponding failover trigger value.

At block 626, a failover timer is reset. The failover timer may be reset each time a node is failed over. Thus, the value of the failover timer may represent the time that has passed since the last node was failed over. If a sufficient amount of time has passed since the last node was failed over (e.g., represented by the healing time), then this may indicate that enough time has passed to allow the network to heal and that any future trigger conditions may indicate a new outage has occurred in the service. After resetting the failover timer, the failover operation routine 600 proceeds to block 632 so that the FC can be incremented, thereby indicating that a node has been failed over.

At block 628, a node with the worst KPI value is instructed to failover. For example, trigger conditions may be present for at least two different nodes. Thus, the failover operation routine 600 can determine which of the nodes has the worst KPI value and failover that node. The worst KPI value may be the node that has a KPI value that is farthest from a corresponding failover trigger value. In some embodiments, the failover operation routine 600 performs block 628 prior to optionally performing block 620. Thus, if the node previously failed over has the worst KPI, then no further operations may be needed (e.g., the previous failover operation would not need to be undone). After instructing the node with the worst KPI value to failover, the failover operation routine 600 proceeds to block 626.

At block 630, the variable i is incremented by an appropriate amount, here 1. The failover operation routine 600 then reverts back to block 608 so that the KPIs of the next node can compared with corresponding failover trigger values.

At block 632, the FC is incremented by an appropriate amount, here 1. The failover operation routine 600 then reverts back to block 616 so that the FIS 130 can determine whether additional KPIs and/or nodes need to be evaluated.

At block 634, a determination can be made as to whether the failover timer value exceeds the healing time. The failover operation routine 600 can continuously perform block 634 concurrently and simultaneously with the other blocks 602 through 630 of the failover operation routine 600. If the failover timer value exceeds the healing time, this may indicate that a sufficient amount of time has passed to allow the network to heal after a node has been failed over. Thus, if the failover timer value exceeds the healing time, the failover operation routine 600 proceeds to block 636 and sets FC to equal 0. Accordingly, the failover operation routine 600 may proceed from block 614 to 618 even if a node has been previously failed over.

The FIS 130 can perform the failover operation routine 600 as described herein for any number of services and/or any number of nodes.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   obtaining one or more key performance indicator (KPI) values associated with one or more nodes in a core network that offer a first service, wherein the one or more KPI values are associated with the first service;
   comparing a first KPI value in the one or more KPI values with a first threshold value;
   determining that the first KPI value exceeds the first threshold value;
   determining that the first KPI value corresponds with a first node in the one or more nodes;
   instructing the first node to re-route requests corresponding to the first service to a second node in the one or more nodes that is redundant to the first node;
   obtaining one or more second KPI values associated with the one or more nodes after the first node is instructed to re-route the requests;
   determining that a second KPI value in the one or more second KPI values exceeds a second threshold value;
   determining that the second KPI value corresponds with a third node in the one or more nodes;
   instructing the first node to no longer re-route the requests corresponding to the first service; and
   instructing the third node to re-route second requests corresponding to the first service to a fourth node in the one or more nodes that is redundant to the third node.

2. The computer-implemented method of claim 1, further comprising:
   resetting a failover timer after instructing the first node to re-route the requests corresponding to the first service; and
   determining, in response to determining that the second KPI value exceeds the second threshold value, that a value of the failover timer does not exceed a threshold healing time.

3. The computer-implemented method of claim 1, determining that the second KPI value deviates from the second threshold value by an amount greater than an amount by which the first KPI value deviates from the first threshold value.

4. The computer-implemented method of claim 1, wherein the third node further offers a second service, and wherein the third node does not re-route third requests corresponding to the second service.

5. The computer-implemented method of claim 1, wherein the first node and the second node perform the same operations.

6. The computer-implemented method of claim 1, wherein the first service is one of a file transfer service, a voice call service, a call waiting service, a conference call service, a video chat service, or a short message service (SMS).

7. The computer-implemented method of claim 1, wherein the first node comprises one of a session border controller (SBC), a call session control function (CSCF), a breakout gateway control function (BGCF), or a media gateway controller function (MGCF).

8. Non-transitory, computer-readable storage media comprising computer-executable instructions, wherein the computer-executable instructions, when executed by a computer system, cause the computer system to:
   obtain one or more key performance indicator (KPI) values associated with one or more nodes in a core network that offer a first service, wherein the one or more KPI values are associated with the first service;
   compare a first KPI value in the one or more KPI values with a first threshold value;
   determine that the first KPI value exceeds the first threshold value;
   determine that the first KPI value corresponds with a first node in the one or more nodes;
   determine that the first node is responsible for a service outage in the first service in response to the determination that the first KPI value exceeds the first threshold value;
   instruct the first node to re-route requests corresponding to the first service to a second node in the one or more nodes that is redundant to the first node;
   determine that a third node in the one or more nodes is associated with a second KPI value obtained after the first node is instructed, wherein the second KPI value exceeds a second threshold value;
   instruct the first node to no longer re-route the requests corresponding to the first service; and instruct the third node to re-route second requests corresponding to the first service to a fourth node in the one or more nodes that is redundant to the third node.

9. The non-transitory, computer-readable storage media of claim 8, wherein the computer-executable instructions further cause the computer system to obtain, in response to instructing the first node to re-route the requests, the second KPI value, wherein the second KPI value is obtained at a time after a time that the one or more KPI values are obtained.

10. The non-transitory, computer-readable storage media of claim 9, wherein the computer-executable instructions further cause the computer system to:
reset a failover timer after instructing the first node to re-route the requests corresponding to the first service; and
determine, in response to determining that the second KPI value exceeds the second threshold value, that a value of the failover timer exceeds a threshold healing time.

11. The non-transitory, computer-readable storage media of claim 9, wherein the computer-executable instructions further cause the computer system to:
reset a failover timer after instructing the first node to re-route the requests corresponding to the first service;
determine, in response to determining that the second KPI value exceeds the second threshold value, that a value of the failover timer does not exceed a threshold healing time; and
determine that the second KPI value deviates from the second threshold value by an amount greater than an amount by which the first KPI value deviates from the first threshold value.

12. The non-transitory, computer-readable storage media of claim 9, wherein the computer-executable instructions further cause the computer system to:
reset a failover timer after instructing the first node to re-route the requests corresponding to the first service; and
determine, in response to determining that the second KPI value exceeds the second threshold value, that a value of the failover timer does not exceed a threshold healing time.

13. The non-transitory, computer-readable storage media of claim 8, wherein the first node further offers a second service, and wherein the first node does not re-route second requests corresponding to the second service.

14. The non-transitory, computer-readable storage media of claim 8, wherein the first node and the second node perform the same operations.

15. The non-transitory, computer-readable storage media of claim 8, wherein the first service is one of a file transfer service, a voice call service, a call waiting service, a conference call service, a video chat service, or a short message service (SMS).

16. The non-transitory, computer-readable storage media of claim 8, wherein the first node comprises one of a session border controller (SBC), a call session control function (CSCF), a breakout gateway control function (BGCF), or a media gateway controller function (MGCF).

17. A core network comprising:
one or more nodes that each offer a first service; and
a failover and isolation server (FIS) comprising a processor in communication with the one or more nodes and configured with specific computer-executable instructions to:
obtain one or more key performance indicator (KPI) values associated with the one or more nodes, wherein the one or more KPI values are associated with the first service;
compare a first KPI value in the one or more KPI values with a first threshold value;
determine that the first KPI value exceeds the first threshold value;
determine that the first KPI value corresponds with a first node in the one or more nodes;
determine that the first node is responsible for a service outage in the first service in response to the determination that the first KPI value exceeds the first threshold value;
initiate a failover operation with respect to the first node such that the first node redirects requests corresponding to the first service to a second node in the one or more nodes that is redundant to the first node;
determine that a third node in the one or more nodes is associated with a second KPI value obtained after the first node is instructed, wherein the second KPI value exceeds a second threshold value;
instruct the first node to no longer redirect the requests corresponding to the first service; and
instruct the third node to redirect second requests corresponding to the first service to a fourth node in the one or more nodes that is redundant to the third node.

18. The core network of claim 17, wherein the FIS is further configured with specific computer-executable instructions to obtain, in response to initiating the failover operation, the second KPI value, wherein the second KPI value is obtained at a time after a time that the one or more KPI values are obtained.

19. The core network of claim 18, wherein the FIS is further configured with specific computer-executable instructions to:
reset a failover timer after instructing the first node to re-route the requests corresponding to the first service; and
determine, in response to determining that the second KPI value exceeds the second threshold value, that a value of the failover timer exceeds a threshold healing time.

20. The core network of claim 18, wherein the FIS is further configured with specific computer-executable instructions to:
reset a failover timer after instructing the first node to re-route the requests corresponding to the first service;
determine, in response to determining that the second KPI value exceeds the second threshold value, that a value of the failover timer does not exceed a threshold healing time; and
determine that the second KPI value deviates from the second threshold value by an amount greater than an amount by which the first KPI value deviates from the first threshold value.

21. Non-transitory, computer-readable storage media comprising computer-executable instructions, wherein the computer-executable instructions, when executed by a computer system, cause the computer system to:
obtain one or more key performance indicator (KPI) values associated with one or more nodes in a core network that offer a first service, wherein the one or more KPI values are associated with the first service;
compare a first KPI value in the one or more KPI values with a first threshold value;

determine that the first KPI value exceeds the first threshold value;
determine that the first KPI value corresponds with a first node in the one or more nodes;
instruct the first node to re-route requests corresponding to the first service to a second node in the one or more nodes that is redundant to the first node;
obtain, in response to instructing the first node to re-route the requests, one or more second KPI values associated with the one or more nodes, wherein the one or more second KPI values are obtained at a time after a time that the one or more KPI values are obtained;
determine that a second KPI value in the one or more second KPI values exceeds a second threshold value;
determine that the second KPI value corresponds with a third node in the one or more nodes;
reset a failover timer after instructing the first node to re-route the requests corresponding to the first service;
determine, in response to determining that the second KPI value exceeds the second threshold value, that a value of the failover timer exceeds a threshold healing time; and
instruct the third node to re-route second requests corresponding to the first service to a fourth node in the one or more nodes that is redundant to the third node.

22. Non-transitory, computer-readable storage media comprising computer-executable instructions, wherein the computer-executable instructions, when executed by a computer system, cause the computer system to:
obtain one or more key performance indicator (KPI) values associated with one or more nodes in a core network that offer a first service, wherein the one or more KPI values are associated with the first service;
compare a first KPI value in the one or more KPI values with a first threshold value;
determine that the first KPI value exceeds the first threshold value;
determine that the first KPI value corresponds with a first node in the one or more nodes;
instruct the first node to re-route requests corresponding to the first service to a second node in the one or more nodes that is redundant to the first node;
obtain, in response to instructing the first node to re-route the requests, one or more second KPI values associated with the one or more nodes, wherein the one or more second KPI values are obtained at a time after a time that the one or more KPI values are obtained;
determine that a second KPI value in the one or more second KPI values exceeds a second threshold value;
determine that the second KPI value corresponds with a third node in the one or more nodes;
reset a failover timer after instructing the first node to re-route the requests corresponding to the first service;
determine, in response to determining that the second KPI value exceeds the second threshold value, that a value of the failover timer does not exceed a threshold healing time;
determine that the second KPI value deviates from the second threshold value by an amount greater than an amount by which the first KPI value deviates from the first threshold value;
instruct the first node to no longer re-route the requests corresponding to the first service; and
instruct the third node to re-route second requests corresponding to the first service to a fourth node in the one or more nodes that is redundant to the third node.

23. Non-transitory, computer-readable storage media comprising computer-executable instructions, wherein the computer-executable instructions, when executed by a computer system, cause the computer system to:
obtain one or more key performance indicator (KPI) values associated with one or more nodes in a core network that offer a first service, wherein the one or more KPI values are associated with the first service;
compare a first KPI value in the one or more KPI values with a first threshold value;
determine that the first KPI value exceeds the first threshold value;
determine that the first KPI value corresponds with a first node in the one or more nodes;
instruct the first node to re-route requests corresponding to the first service to a second node in the one or more nodes that is redundant to the first node;
obtain, in response to instructing the first node to re-route the requests, one or more second KPI values associated with the one or more nodes, wherein the one or more second KPI values are obtained at a time after a time that the one or more KPI values are obtained;
determine that a second KPI value in the one or more second KPI values exceeds a second threshold value;
determine that the second KPI value corresponds with a third node in the one or more nodes;
reset a failover timer after instructing the first node to re-route the requests corresponding to the first service;
determine, in response to determining that the second KPI value exceeds the second threshold value, that a value of the failover timer does not exceed a threshold healing time; and
determine that the first KPI value deviates from the second threshold value by an amount greater than an amount by which the second KPI value deviates from the first threshold value.

24. A core network comprising:
one or more nodes that each offer a first service; and
a failover and isolation server (FIS) comprising a processor in communication with the one or more nodes and configured with specific computer-executable instructions to:
obtain one or more key performance indicator (KPI) values associated with the one or more nodes, wherein the one or more KPI values are associated with the first service;
compare a first KPI value in the one or more KPI values with a first threshold value;
determine that the first KPI value exceeds the first threshold value;
determine that the first KPI value corresponds with a first node in the one or more nodes;
initiate a failover operation with respect to the first node such that the first node redirects requests corresponding to the first service to a second node in the one or more nodes that is redundant to the first node;
obtain, in response to instructing the first node to re-route the requests, one or more second KPI values associated with the one or more nodes, wherein the one or more second KPI values are obtained at a time after a time that the one or more KPI values are obtained;
determine that a second KPI value in the one or more second KPI values exceeds a second threshold value;
determine that the second KPI value corresponds with a third node in the one or more nodes;

reset a failover timer after instructing the first node to re-route the requests corresponding to the first service;

determine, in response to determining that the second KPI value exceeds the second threshold value, that a value of the failover timer exceeds a threshold healing time; and initiate a failover operation with respect to the third node such that the third node redirects second requests corresponding to the first service to a fourth node in the one or more nodes that is redundant to the third node.

25. A core network comprising:

one or more nodes that each offer a first service; and a failover and isolation server (FIS) comprising a processor in communication with the one or more nodes and configured with specific computer-executable instructions to:

obtain one or more key performance indicator (KPI) values associated with the one or more nodes, wherein the one or more KPI values are associated with the first service;

compare a first KPI value in the one or more KPI values with a first threshold value;

determine that the first KPI value exceeds the first threshold value;

determine that the first KPI value corresponds with a first node in the one or more nodes;

initiate a failover operation with respect to the first node such that the first node redirects requests corresponding to the first service to a second node in the one or more nodes that is redundant to the first node;

obtain, in response to instructing the first node to re-route the requests, one or more second KPI values associated with the one or more nodes, wherein the one or more second KPI values are obtained at a time after a time that the one or more KPI values are obtained;

determine that a second KPI value in the one or more second KPI values exceeds a second threshold value;

determine that the second KPI value corresponds with a third node in the one or more nodes;

reset a failover timer after instructing the first node to re-route the requests corresponding to the first service;

determine, in response to determining that the second KPI value exceeds the second threshold value, that a value of the failover timer does not exceed a threshold healing time;

determine that the second KPI value deviates from the second threshold value by an amount greater than an amount by which the first KPI value deviates from the first threshold value;

reverse the failover operation initiated with respect to the first node such that the first node no longer redirects the requests corresponding to the first service; and initiate a failover operation with respect to the third node such that the third node redirects second requests corresponding to the first service to a fourth node in the one or more nodes that is redundant to the third node.

\* \* \* \* \*